3,317,434
METHOD OF ENCAPSULATING PARTICULATE MATTER BY COACERVATION USING GELATINS OF OPPOSITE ISOIONIC pH

Arthur Veis, Skokie, and Jerome Cohen and Catherine Aranyi, Chicago, Ill., assignors to Armour and Company, Chicago, Ill., a corporation of Delaware
No Drawing. Filed July 10, 1963, Ser. No. 294,167
7 Claims. (Cl. 252—316)

This invention relates to a method of encapsulating particulate matter. The method is applicable to the coating or encapsulation of both liquid and solid particles.

It has been known that dissimilar polyelectrolytes such as gum arabic and gelatin can be employed for encapsulation purposes by a procedure involving the coacervation of the dissimilar polyions. Gum arabic is a relatively expensive material for such applications, and there are certain deficiencies and disadvantages encountered in the coacervation of gum arabic with gelatin, such as removal of the gum arabic, etc. It is therefore a general object of this invention to provide an improved method of encapsulation which does not require the use of gum arabic. Further objects and advantages will be indicated in the following detailed specification.

This invention is based in part on the discovery that ordinary gelatins alone without any other polyelectrolyte can be employed for encapsulating particulate matter by a coacervation procedure. More specifically, it has been discovered that ordinary acid-precursor gelatin can be employed in admixture with an ordinary alkali-precursor gelatin to form a coacervation system for the encapsulation of liquid and solid particles. This invention also includes the particular procedure and conditions required to accomplish the encapsulation while using gelatins as the only polyions.

This application is a continuation-in-part of our copending application Ser. No. 67,167, filed Nov. 4, 1960, now Patent No. 3,176,001.

The gelatin employed in the practice of this invention may be derived from any of the usual collagen sources, including hide pieces, pork skins, ossein, tendons, etc. Any of the usual extraction methods may be used to prepare the gelatins. Acid-precursor gelatin can be produced by an acid extraction of the collagen under suitable temperature conditions, or alkali-precursor gelatin can be produced by an alkaline extraction of the collagen. Alternatively, the collagen material can be soaked under acid or alkaline conditions and then extracted at an approximately neutral pH to obtain respectively an acid-precursor or an alkaline-precursor gelatin. The acid-precursor gelatins are generally characterized by having an isoionic pH above 7.5, while the alkali-precursor gelatins are characterized by having an isoionic pH below 6.0. For example, a typical acid-precursor gelatin has an isoionic pH within the range from about pH 8.5 to 9.5. Similarly, a typical alkali-precursor gelatin has a pH within the range from 4.5 to 5.5. As a specific example, an acid precursor gelatin having a pH within the range from 8.8 to 9.1 can be employed in combination with an alkali-precursor gelatin which has a pH within the range from 4.9 to 5.1. Since acid and alkali-precursor gelatins are generally operable in the method of this invention, it is not believed that it will be necessary to further describe them herein. Such gelatins are well-known to the gelatin industry, and are readily available commercially. As previously indicated, these gelatins can be characterized in terms of their isoionic pH's. The "isoionic pH" is the natural pH of the protein in water which contains no extraneous hydroxide or hydroxyl ions.

For best results in practicing the present invention, the aqueous gelatin solutions should be substantially salt-free. It has been found that the presence of salts interferes with coacervation. In one preferred embodiment, the ionic strength of the gelatin solutions is kept below about $10^{-3}$. Since both acid and alkali precursor gelatin as extracted contain substantial quantities of salt, it is desirable to remove the salt prior to the use of the gelatin solutions in the method of this invention. For example, the gelatin solutions can be deionized until the solutions are substantially free of micro-cations and micro-anions as distinguished from macro or colloidal ions. One simple method, in the method we prefer to use, for preparing low ionic strength gelatin solutions is mixed bed resin ion exchange. Typically, an anion exchange resin such as Amberlite IRA–400 and a cationic exchange resin such as Amberlite IR–120 are mixed, water washed, and packed in columns. The liquid gelatin solutions are circulated through the columns prior to blending, that is, the alkali-precursor gelatin solution is deionized separately from the alkali-precursor gelatin solution. A double bed, separate anion and cationic exchangers method may be used although we prefer the single mixed bed method in which the gelatins are not subjected to extreme changes in pH during deionization.

The particulate matter to be encapsulated by the method of this invention is dispersed in one of the different gelatin solutions. For certain systems, there may be some slight advantages in dispersing the particulate matter in the acid-precursor gelatin rather than in the alkali-precursor gelatin or vice versa, but speaking generally, the particulate matter can be dispersed in either of the gelatins prior to the mixing of the two gelatins. A wide variety of liquid or solid particles can be encapsulated. For best results, the material to be encapsulated should be water-insoluble, and non-reactive with the gelatin. Finely divided solid particles can be dispersed in the gelatin solution to form a suspension. Where it is desired to incorporate particles of a liquid, the liquid is emulsified with the gelatin solution, the gelatin solution forming the continuous phase, and the liquid as the dispersed or non-continuous phase. Larger objects can be coated by applying one of the gelatin solutions to the exterior surface of the object, and then the other gelatin solution.

The gelatin solutions, one of which will contain the particulate matter to be encapsulated, should be at a temperature of at least 35° C. but not over about 65° C. when the solutions are mixed and blended. At temperatures below 35° C. or above 65° C. for the initial mixing or blending, the encapsulation does not proceed in a satisfactory manner. At temperatures above 65° C. there is also danger of hydrolyzing the gelatin. Preferably, the mixing of the acid precursor gelatin with the alkali-precursor gelatin is carried out at a temperature within the range from 38 to 60° C.

After the gelatin solutions have been mixed in the presence of the dispersed particulate matter, the temperature of the mixture is reduced to encapsulate at least a portion of the particulate matter by gelatin-gelatin coacervation. Speaking generally, the temperature of the mixture should be reduced below 35° C. and at least 5° C. below the mixing temperature. Preferably, the temperature of the mixture is reduced to at least 10° C. below the mixing temperature. In one preferred embodiment, the mixing is carried out at a temperature of at least 40° C., and thereafter the mixture is reduced to a temperature below 30° C. If desired, the temperature of the solution can be further reduced down to temperatures as low as 5 to 10° C., or even to temperatures approaching the freezing point of the solution. Usually, however, there will be no advantage in reducing the temperature much below 20° C.

The concentration of the gelatin in the solutions to be mixed can vary considerably. For example, solution concentrations of from 0.05% to 5% gelatin may be used. However, it is preferred to use gelatin solutions having a concentration within the range from 0.1 to 3% by weight of gelatin based on the solution. At temperatures above 40° C. within the concentrations specified, there will usually be no problem of avoiding the gel state for the gelatin solutions.

The gelatin solutions can be mixed in varying proportions. However, since coacervation occurs on an approximately electrical equivalent basis, it is preferred to employ equal quantities of the acid and alkali precursor gelatins. This can conveniently be done by utilizing equal solution volumes which contain the two gelatins at approximately the same concentrations. However, one of the gelatins may be present in excess, since the encapsulated material will precipitate out of the solution as a separate phase, leaving the excess gelatin in the dilute supernatant phase.

The encapsulated particles can be separated from the dilute supernatant by any suitable procedure, such as decantation, centrifugation, or filtration. In commercial practice, usually centrifugal separation will be the most advantageous. The present invention, however, does not involve any particular method of separating the encapsulated particles.

This invention is further illustrated by the following specific examples.

*Example 1*

Solutions were prepared by dispersing gelatins in cold water and then heating to 60° C. A concentration of two gms. of gelatin per 100 ml. of water proved most suitable but a lesser or greater concentration could also be employed. The gelatins employed were the following:

(1) Calf skin gelatin, alkali-precursor type, having an isoionic pH of 5.0.
(2) Pork skin gelatin, acid-precursor type, having an isoionic pH of 9.0.

Both solutions were deionized prior to use by passage through a column of mixed ion exchange resins. A typical column would consist of 2½ parts of anion exchange resin, Amberlite IRA-400, and 1 part of cation exchange resin, Amberlite IR-120. During the passage through the resin columns, both the gelatin solutions and the resin columns were maintained above 40° C. in order to accelerate the flow rate through the resin. This method of deionization is essentially as described by J. W. Janus in Research, April 1951.

*Example 2*

200 gms. of a 2% solution of the deionized calf skin gelatin of Example 1, having an isoionic pH of approximately 5.0, was warmed to 50° C. and to this was dispersed by high speed stirring 50 grams of a solution of a pressure sensitive adhesive consisting of the following:

| | Gms. |
|---|---|
| Toluene (or carbon tetrachloride) | 450 |
| Vistanex MM100 | 50 |
| Piccolyte S115 | 25 |
| Mineral oil | 20 |

After dispersing this solution in the calf skin gelatin, two hundred gms. of a deionized 2% solution of pork skin gelatin of Example 1, having an isoionic pH of approximately 9.0 was added at a temperature of 50° C. to the dispersion and the entire mixture allowed to cool. The coacervation reaction between the two gelatins provided a coating for the surface of the dispersed pressure sensitive material. This was separated from the remainder of the solution and applied by means of a coating device to the surface of a sheet of paper. The resulting coated sheet was non-adhesive when dried but displayed adhesive properties for such surfaces as wood, metal, paper and plastic films when subjected to heat and pressure which ruptured capsules enclosing the adhesive material.

*Example 3*

This involved a dispersion process similar to that described in Example 2 utilizing a deionized calf skin gelatin solution prepared as in Example 1. However, in this case, instead of solutions of pressure sensitive adhesives, plasticizers for resins were involved. Such material as dibutyl phthalate and Resoflex R296, a polymer prepared by reacting ethylene glycol with adipic acid, were utilized. These materials have the property of adding plasticity and tackiness when added to resins, being especially effective when utilized with polyvinyl acetate-type resins. After the plasticizers were dispersed in the 2% calf skin gelatin solution (in the ratio of 50 gms. of the former to 200 gms. of the latter) the dispersion was coacervated by the addition of 200 gms. of a dionized solution of the pork skin gelatin of Example 1, having a 2% concentration. After separation of the encapsulated plasticizers, they were mixed with equal weights of polyvinyl acetate emulsion, coated on paper and dried. The resulting coating was non-adhesive and non-tacky until treated with heat at which point the capsules of plasticizer ruptured and the coatings become quite flexible and displayed adhesive properties which were effective on paper, wood, metal, and a number of plastic films.

*Example 4*

The method may be further illustrated by a system involving an epoxy resin. The gelatins used are deionized acid and alkali precursor samples with isoionic points at pI=9 and 5, respectively. An epoxy resin is emulsified in one of the gelatin solutions at 40° C. The other gelatin is then added whereby a coacervate coating is formed around the resin droplets, resulting from the difference in the electrostatic charges. The second component of the adhesive, the catalyst, is added and is also emulsified by the action of the gelatin, and is adsorbed upon the surface of the coacervate droplets already formed. The temperature is dropped to 30° C. resulting in the formation of an additional coacervate layer enveloping the catalyst. The addition of formaldehyde serves to harden the thus formed capsules and they may be separated from the equilibrium liquid of the mixed gelatin solutions and dried. Capsules may be prepared containing more than 90% resin and catalyst.

*Example 5*

Deionize an acid-precursor (pI=9.0) and an alkali-precursor gelatin (pI=5.0) by ion-exchange techniques or by electrodialysis. Make up each to about a 0.5% solution in deionized water at 40° C. Mix dry polystyrene beads into either one of the solutions. The beads wet readily and are easily dispersed. Add an equal volume of the second gelatin solution, also at 40° C. and stir for a few minutes. Then allow the system to cool to room temperature. The coated beads will settle nicely to the bottom and the supernatant liquid is easily poured off. Wash the beads with cold water to remove any excess gelatin, then pour the wet, coated beads into acetone. This dehydrates the beads. Dry them and they are ready for use.

It will be apparent to those skilled in the art that this invention is applicable to the coating or encapsulation of a wide variety of solid and liquid particles. By way of further example, the method can be applied to form pressure-rupturable capsules containing an adhesive dissolved in a volatile solvent, which can be used for coating adhesive tapes. A suitable adhesive for this purpose is chlorinated rubber dissolved in diethyl benzene. Another application is the separate coating of an adhesive and a solvent therefor. More specifically, chlorinated rubber can be coated separately, and a petroleum fraction encapsulated. In this procedure, two separate gelatin coacervations would be carried out with the chlorinated rubber particles, either in liquid or solid form, dispersed in one of the gelatin phases. In a separate coacervation, the petroleum fraction would be emulsified with one of the gelatin layers, and encapsulated. The encapsulated particles of chlorinated rubber could then be applied as a coating or layer on a sheet or tape, and the encapsulated petroleum fraction could be applied as a separate layer. The application of heat and/or pressure to the sheet would then rupture the capsules containing the petroleum fraction, and permit the liquid to contact the chlorinated rubber, the capsules of which would also be ruptured. This would form a tacky adhesive material for attachment of the sheet or tape.

The method of this invention can also be applied to form a manifold record material, as described in Patent 2,730,456. Speaking generally, the method of this invention can be used for coating or encapsulating any materials which have previously been coated or encapsulated by a gelatin-gum arabic system.

While in the foregoing specification this invention has been described in relation to certain specific embodiments thereof, and many details have been set forth for purpose of illustration, it will be apparent to those skilled in the art that the method of this invention is susceptible to many other embodiments and that certain of the details described herein can be varied considerably without departing from the basic principles of the invention.

We claim:
1. The method of encapsulating particulate matter, comprising dispersing the particulate matter in a first aqueous solution of gelatin, mixing a second aqueous solution of a different gelatin with said first solution, said mixing being carried out at a temperature of at least 35° C. but not over 65° C., the gelatin in one of said solutions being acid-precursor gelatin having an isoionic pH above 7.5 and the gelatin in the other of said solutions being alkali-precursor gelatin having an isoionic pH below 6.0 and both of said gelatin solutions being substantially salt-free, reducing the temperature of the mixture thus obtained to a temperature below 35° C. and at least 5° C. below the mixing temperature to encapsulate at least a portion of said particulate matter by gelatin-gelatin coacervation, and separating the encapsulated particulate matter.

2. The method of claim 1 wherein said acid-precursor gelatin has an isoionic pH of from about 8.5 to 9.5 and said alkali-precursor gelatin has an isoionic pH from about 4.5 to 5.5.

3. The method of claim 1 wherein said gelatin solutions are mixed at a temperature within the range from 38 to 60° C., and wherein the temperature of said solution is reduced at least 10° C. below the mixing temperature.

4. The method of encapsulating particulate matter, comprising dispersing water-insoluble particulate matter in a first aqueous solution of gelatin, mixing a second aqueous solution of a different gelatin with said first solution, said mixture being carried out at a temperature ranging from 38 to 60° C., the gelatin in one of said solutions being acid-precursor gelatin having an isoionic pH ranging from about 8.5 to 9.5 and the gelatin in the other of said solutions being alkali-precursor gelatin having an isoionic pH ranging from about 4.5 to 5.5, reducing the temperature of the mixture thus obtained to a temperature at least 10° C. below the mixing temperature to encapsulate at least a portion of said particulate matter, and separating the encapsulated particulate matter.

5. The method of encapsulating particulate matter, comprising dispersing water-insoluble particulate matter in a first aqueous solution of gelatin, mixing a second aqueous solution of a different gelatin with said first solution, said mixing being carried out at a temperature within the range from 38 to 60° C., the gelatin in one of said solutions being acid-precursor gelatin having an isoionic pH of about 8.8 to 9.1 and the gelatin of the other of said solutions being alkali-precursor gelatin having an isoionic pH of about 4.9 to 5.1, both of said gelatin solutions being substantially salt-free and having a concentration ranging from 0.1 to 3% by weight, reducing the temperature of the mixture to a temperature below 30° C. to encapsulate at least a portion of said particulate matter, and separating the encapsulated particulate matter.

6. The method of encapsulating a water-immiscible liquid, comprising emulsifying said liquid in a first aqueous solution of gelatin with said liquid being the dispersed phase, mixing a second aqueous solution of a different gelatin with said first solution, said mixing being carried out at a temperature of at least 35° C. but not over 65° C., the gelatin in said one of said solutions being acid-precursor gelatin having an isoionic pH above 7.5 and the gelatin in the other of said solutions being alkali-precursor gelatin having an isoionic pH below 6.0, the mixed gelatin solutions being substantially salt-free, reducing the temperature of the mixed solutions to a temperature below 35° C. and at least 5° C. below the mixing temperature to encapsulate at least a portion of said dispersed liquid by gelatin-gelatin coacervation, and separating the encapsulated liquid.

7. The method of encapsulating a water-insoluble solid material, comprising dispersing particles of the said solid material in a first aqueous solution of gelatin, mixing a second aqueous solution of a different gelatin with said first solution, said mixing being carried out at a temperature of at least 35° C. but not over 65° C., the gelatin in one of said solutions being acid-precursor gelatin having an isoionic pH above 7.5 and the gelatin in the other of said solutions being alkali-precursor gelatin having an isoionic pH below 6.0, the mixed gelatin solutions being substantially salt-free, reducing the temperature of the mixed solutions to a temperature below 35° C. and at least 5° C. below the mixing temperature to encapsulate at least a portion of said solid particles by gelatin-gelatin coacervation, and separating the encapsulated solid particles.

References Cited by the Examiner

UNITED STATES PATENTS

| | | | |
|---|---|---|---|
| 2,800,457 | 7/1957 | Green et al. | 117—164 X |
| 2,858,238 | 10/1958 | Brown | 117—164 |
| 3,176,001 | 3/1965 | Veis et al. | 260—118 |

WILLIAM H. SHORT, *Primary Examiner.*

H. SCHAIN, *Assistant Examiner.*